United States Patent
Cho et al.

(10) Patent No.: US 9,277,283 B2
(45) Date of Patent: Mar. 1, 2016

(54) CONTENT SYNCHRONIZATION APPARATUS AND METHOD

(75) Inventors: Jeong-Mi Cho, Seongnam-si (KR); So-Young Jeong, Seoul (KR); Jeong-Su Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 13/217,449

(22) Filed: Aug. 25, 2011

(65) Prior Publication Data

US 2012/0177067 A1     Jul. 12, 2012

(30) Foreign Application Priority Data

Jan. 7, 2011   (KR) .................. 10-2011-0001853

(51) Int. Cl.
| | |
|---|---|
| *H04L 12/28* | (2006.01) |
| *H04N 21/478* | (2011.01) |
| *H04N 21/41* | (2011.01) |
| *H04N 21/43* | (2011.01) |
| *H04N 21/45* | (2011.01) |
| *H04N 21/4725* | (2011.01) |
| *H04J 1/16* | (2006.01) |

(52) U.S. Cl.
CPC ..... *H04N 21/47815* (2013.01); *H04N 21/4126* (2013.01); *H04N 21/4307* (2013.01); *H04N 21/4532* (2013.01); *H04N 21/4725* (2013.01)

(58) Field of Classification Search
CPC ......... H04J 3/06; H04J 3/0632; H04J 3/0664; H04J 3/0685; H04N 5/44; H04N 5/4401; H04N 5/44543; H04N 7/106; H04N 7/165; H04N 7/173; H04N 7/17309; H04N 7/17318; H04N 7/17336; H04N 21/812; H04N 21/4532; H04N 21/4622; H04N 21/8586; H04N 21/25883; H04N 21/43637; H04N 21/43615; H04N 21/44222; H04N 21/47202
USPC ................................. 370/252, 329, 386, 503
See application file for complete search history.

(56) References Cited

U.S. PATENT DOCUMENTS

| | | | | |
|---|---|---|---|---|
| 5,774,859 | A | * | 6/1998 | Houser et al. ................. 704/275 |
| 7,092,569 | B1 | * | 8/2006 | Kinjo ............................. 382/190 |
| 7,814,518 | B2 | | 10/2010 | Ducheneaut et al. |

(Continued)

FOREIGN PATENT DOCUMENTS

| | | |
|---|---|---|
| CN | 101655870 A | 2/2010 |
| KR | 10-2009-0044700 | 5/2009 |
| KR | 10-0963238 | 6/2010 |

OTHER PUBLICATIONS

Chinese Office Action issued Jan. 21, 2016, in counterpart of Chinese Application No. 201110412415.6 (10 pages, in Chinese).

*Primary Examiner* — John Pezzlo
(74) *Attorney, Agent, or Firm* — NSIP Law

(57) ABSTRACT

A content synchronization apparatus is provided. The content synchronization apparatus includes a communication unit configured to communicate with a device that the content synchronization apparatus can synchronize content with, a control unit configured to, in response to a synchronization command to share current content being played by the device being received, share the current content by acquiring the current content and state information corresponding to the current content through the communication unit, synchronize the current content with the device using the current content and the state information, and configure a display screen based on the results of the synchronization of the current content with the device, and an output unit configured to display the configured display screen.

28 Claims, 8 Drawing Sheets

(56) References Cited

U.S. PATENT DOCUMENTS

| | | |
|---|---|---|
| 7,882,530 B2 * | 2/2011 | Ducheneaut et al. ........... 725/80 |
| 9,075,805 B2 | 7/2015 | Fisher et al. |
| 2003/0229900 A1 * | 12/2003 | Reisman ........... G06F 17/30873 725/87 |
| 2006/0230415 A1 * | 10/2006 | Roeding ........................ 725/34 |
| 2007/0136769 A1 * | 6/2007 | Goldberg et al. ............... 725/81 |
| 2007/0157251 A1 * | 7/2007 | Shrivastava et al. ............ 725/60 |
| 2009/0167787 A1 | 7/2009 | Bathiche et al. |
| 2010/0315418 A1 | 12/2010 | Woo |
| 2012/0069131 A1 * | 3/2012 | Abelow ...................... 348/14.01 |
| 2015/0306496 A1 * | 10/2015 | Haseltine .............. A63F 13/213 463/31 |

* cited by examiner

CONTENT SYNCHRONIZATION APPARATUS AND METHOD

CROSS-REFERENCE TO RELATED APPLICATION(S)

This application claims the benefit under 35 U.S.C. §119(a) of Korean Patent Application No. 10-2011-0001853, filed on Jan. 7, 2011, in the Korean Intellectual Property Office, the entire disclosure of which is incorporated herein by reference for all purposes.

BACKGROUND

1. Field

The following description relates to a content synchronization apparatus and method.

2. Description of the Related Art

Research has been conducted on ways to connect computers, sensors, and various other electronic devices via a wireless connection so that users are provided with a variety of useful services. In response to the electronic devices being commonplace, the necessity to share content between electronic devices has grown.

Augmented reality (AR), which is a technique of laying virtual objects over an image of a physical real-world environment, has been employed in various electronic products. AR may modify a view of reality using computer graphics and may provide not only a view of a physical real-world environment but also information corresponding to the physical real-world environment. By laying a virtual image over a view of a real-world environment through AR, the distinctions between a real-world and virtual-world may become blurred. AR provides a mixture of virtual objects and a real-world environment and may allow users to see the real-world environment, thereby providing a heightened sense of reality and a variety of additional information. For example, by scanning an area around with a smart phone camera, a stereoscopic image showing various information corresponding to stores in the area, such as the stores' locations and phone numbers may be displayed.

SUMMARY

The following description relates to a content synchronization apparatus and method to provide personalized augmented reality (AR) in connection with content synchronized between multiple devices capable of sharing content therebetween and acquiring and manipulating personalized information.

In one general aspect, a content synchronization apparatus is provided. The content synchronization apparatus including a communication unit configured to communicate with a device that the content synchronization apparatus can synchronize content with, a control unit configured to, in response to reception of a synchronization command to share current content being played by the device, share the current content by acquiring the current content and state information corresponding with the current content through the communication unit, synchronize the current content with the device using the current content and the state information, and configure a display screen based on the results of the synchronization of the current content with the device, and an output unit configured to display the configured display screen.

The control unit may acquire augmented information corresponding with the current content from the device and in response to augmented information that can interact with a user of the content synchronization apparatus being selected from the acquired augmented information, may perform a predefined operation corresponding to the selected augmented information.

The content synchronization apparatus may further include a storage unit configured to store user profile information corresponding to a user of the content synchronization apparatus, user preference information corresponding to a user of the content synchronization apparatus, or a combination thereof. The control unit may select augmented information from the acquired augmented information using the user profile information, the user preference information, or a combination thereof and may configure a display screen including the current content and the selected augmented information.

The control unit may acquire content metadata corresponding with the current content from the device and may acquire the current content from another device than the device using the content metadata. The content metadata may be used to search for the current content.

The content metadata may include a web address corresponding to the current content, broadcast channel information corresponding to a broadcast channel from which the current content can be received, or a combination thereof.

The content synchronization apparatus may further include an image acquisition unit configured to capture an image. The control unit in a case in which the reception of the synchronization command in response to an image being captured by the image acquisition unit, may acquire content metadata corresponding to the current content by analyzing the captured image.

The communication unit may communicate with an augmented reality (AR) supporting server, which provides augmented information corresponding a plurality of content items, and the control unit may acquire additional augmented information corresponding to the current content from the AR supporting server using the acquired content metadata and to configure the display screen by rendering the additional augmented information with the current content.

The acquired augmented information may include playback control information for controlling the playback of the current content, and the control unit in response to reception of a user input signal for selecting the playback control information, may control the playback of the current content.

The control unit may execute an application that can interact with a user of the content synchronization apparatus in parallel with the synchronization of the current content.

The application that can interact with the user of the content synchronization apparatus may include an internet search application, a social networking application, or a combination thereof.

The control unit in response to reception of a synchronization command to share content being played by the content synchronization apparatus with the device, may transmit the content being played by the content synchronization apparatus and state information and augmented information corresponding to the content being played by the content synchronization apparatus to the device.

The control unit before the synchronization of the current content may detect the device within a synchronization range of the content synchronization apparatus and may control the communication unit to access the device.

The state information may include information about the content.

The augmented information may include information that is capable of being provided with the content.

In another aspect, a content synchronization apparatus is provided. The content synchronization apparatus includes a communication unit configured to communicate with a device that the content synchronization apparatus can synchronize content with, and a control unit configured to, in response to reception of a synchronization command to share current content being played by the content synchronization apparatus with the device, controls the communication unit to transmit the current content, state information corresponding to the current content to the device and augmented information corresponding to the current content to the device.

The control unit may detect a previously-registered synchronizable device within a synchronization range of the content synchronization apparatus and controls the communication unit to access the detected device.

The content synchronization apparatus may be a mobile terminal, and the device may be a TV.

In yet another aspect, a content synchronization method is provided. The content synchronization method includes receiving a synchronization command to share current content being played by a device, sharing the current content by acquiring the current content and state information corresponding to the current content, and synchronizing the current content with the device using the current content and the state information.

The content synchronization method, may further include acquiring content metadata corresponding to the current content from the device, and directly acquiring the current content from a device other than the device using the content metadata.

The directly acquiring the current content may include, in response to the current content being real-time broadcast content, acquiring the current content by receiving the real-time broadcast content from a broadcast network using the content metadata.

The content synchronization method may further include acquiring augmented information corresponding to the current content from the device. The synchronizing the current content may include synchronizing the current content with the device using the current content, the state information, and the augmented information.

The content synchronization may further include selecting some of the augmented information based on user profile information, user preference information, or a combination thereof, and providing the selected augmented information along with the current content.

The augmented information may include playback control information for controlling the playback of the current content and the content synchronization method may further include, in response to reception of a user input signal for selecting the playback control information, controlling the playback of the current content.

The content synchronization method may further include, in parallel with the synchronizing the current content, executing an application that can be interacted with.

The content synchronization method may further include, in response to reception of a synchronization command to share the current content with another device, transmitting the current content and state information and augmented information corresponding to the current content to the another device.

In yet another aspect, a content synchronization apparatus is provided. The content synchronization apparatus includes a synchronization unit configured to, in response to a synchronization command to share current content being played by a device being received, acquire the current content and state information corresponding to the current content by recognizing the current content and the state information, and to synchronize the current content with the device using the current content and the state information, and an output unit configured to output the synchronized content.

The content synchronization apparatus may further include an image acquisition unit configured to capture an image of a content execution screen corresponding to the current content. The synchronization unit may recognize the current content and the state information by performing object extraction, pattern recognition, character recognition on the content execution screen, or a combination thereof.

The content synchronization apparatus may further include an audio input unit configured to receive an audio signal corresponding to the current content. The synchronization unit may extract feature information from the received audio signal and recognizes audio data corresponding to the feature information.

The content synchronization apparatus may further include a storage unit configured to store at least one content item. The synchronization unit may acquire the recognized current content by searching through the storage unit.

The content synchronization apparatus may further include a communication unit configured to communicate with a content providing server, which searches for content using content metadata and provides content. The synchronization unit may acquire the current content from the content providing server via the communication unit.

In yet another aspect, a content synchronization apparatus is provided. The content synchronization apparatus includes a communication unit configured to communicate with a web server, which provides a web service, an image acquisition unit configured to, in response to reception of a synchronization command to share a web application being executed by a device, capture an image of a web application execution screen corresponding to the web application, and a synchronization unit configured to identify the web application from the captured image, acquire user information for receiving the web service, access the web server using the user information, acquire web application state information corresponding to the web application from the web server through the communication unit, and reproduce an execution state of the web application in the device using the web application and the web application state information.

The user information may include user login information for receiving the web service.

The content synchronization apparatus may further include a storage unit configured to store the user information, which is for receiving the web service using at least one web application. The synchronization unit may acquire the user information from the storage unit.

The communication unit may communicate with the device and the synchronization unit may acquire the user information from the device.

In yet another aspect, a content synchronization apparatus is provided. The content synchronization apparatus includes a detection unit configured to detect another device in response to the other device being located within a synchronization range, a control unit configured to share current content being played by the other device, state information corresponding with the current content, and augmented information corresponding with the current content, in response to detecting of the other device being located within the synchronization range, and a reception unit configured to receive the current content, the state information and the augmented information from the other device.

Other features and aspects may be apparent from the following detailed description, the drawings, and the claims.

Figure 1:
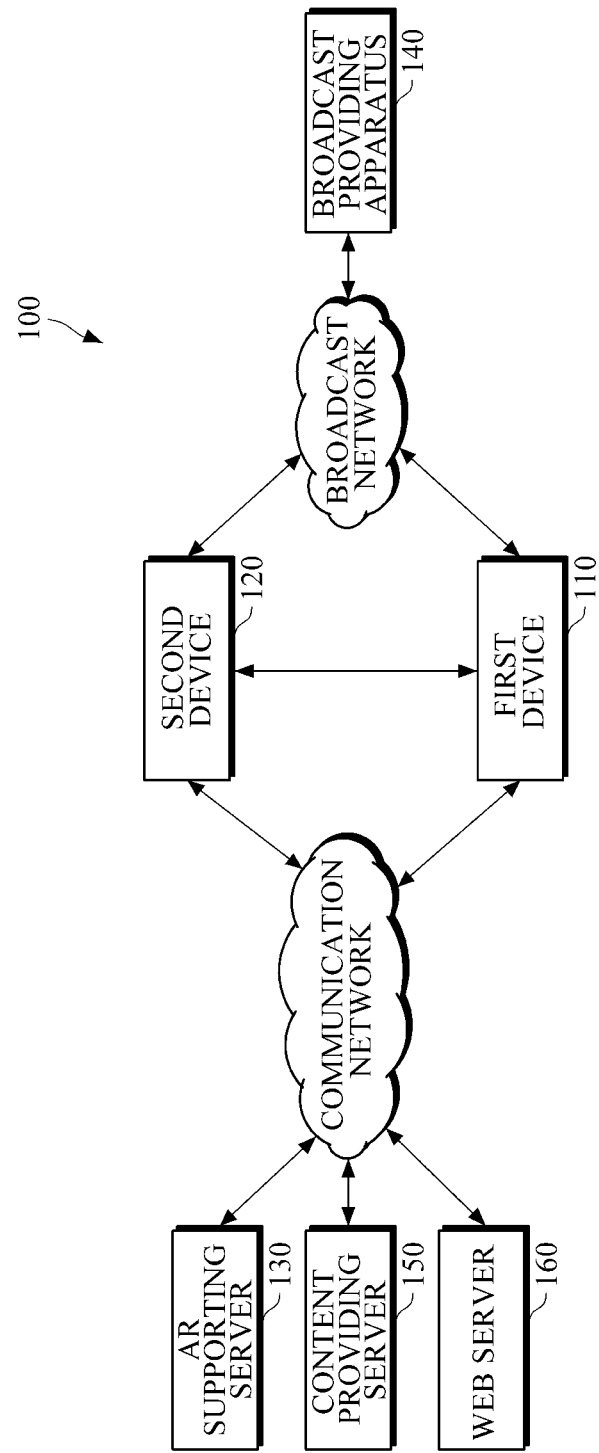
FIG. 1 is a diagram illustrating an example of a system for providing an augmented reality (AR) interaction, which may share information between devices, may provide an interaction synchronized between the devices, and may provide personalized augmented information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a system for providing an augmented reality (AR) interaction, which may share information between devices, may provide an interaction synchronized between the devices, and may provide augmented information.

Referring to FIG. 1, system 100 for providing an AR interaction may allow multiple users to share content with one another, may synchronize the shared content between the multiple users, and may provide an AR interaction synchronized between multiple devices capable of acquiring and manipulating augmented information. The system 100 may include a first device 110, a second device 120, an AR supporting server 130, a broadcast providing apparatus 140, a content providing server 150, and a web server 160.

The first and second devices 110 and 120 may synchronize and share content with each other. For example, the first and second devices 110 and 120 may transmit/receive content, state information, and augmented information to/from each other, and may synchronize and share the content with each other.

For example, the content may include an application executed by a device that provides the content, various types of data (such as photos, video data, audio data, text and the like) played or executed in applications, multimedia data, and content metadata relating to the content. Examples of the application include a media player for playing content, and a web application for providing the content through communication with the web server 160 and for providing various web services.

The content metadata may be information relating to the content, and may be used to search for the content. For example, in a case in which the content is broadcast content, the content metadata may include channel information, title information, broadcast time information, episode number information, and cast information relating to the content.

The state information may correspond to the content. For example, the state information may include volume and playing time information. The state information may include information for reproducing the state information of another device at the time of playing of the content by a device so that the content may be synchronized between the two devices. The state information may also include, for example, screen brightness information corresponding to the device that provides the content. For example, in a case in which the application is a video player program, the content may be a video file played by the video player program, and the state information may include volume information and playing time information.

Augmented information may include 1) information that can be added to and provided along with the content, 2) playback control information for controlling the playback of the content, and 3) an application that can be executed in connection with the content. For example, in a case in which the content is a drama or a movie, the augmented information may include information corresponding to the location of filming of the drama or the movie, original soundtrack (OST) information, a synopsis, and cast information corresponding to the drama or the movie. In another example, in a case in which the content is a sportscast, the augmented information may include sports game statistics information. In another example, in a case in which the content is a music program, the augmented information may include singer information of the music program and an introduction to the music program.

The augmented information may be configured to be interacted with so that a predefined operation may be performed or information corresponding to the augmented information may be provided in response to the augmented information being selected by a user. For example, a purchase or payment service may be performed in response to a user input signal for selecting the augmented information being received.

The first device 110 may provide the user of the first device 110 with augmented information along with content. In a similar, the second device 120 may provide the user of the second device 120 with augmented information along with content.

In a non-limiting example, FIG. 1 illustrates two devices, but there is no limit to the number of devices capable of sharing content therebetween and providing augmented information. In another example, three or more devices may share content therebetween.

The first and second devices 110 and 120 may be of the same type of device or different types of devices. For example, the first and second devices 110 and 120 may both be mobile terminals. In another example, the first device 110 may be a mobile terminal, and the second device 120 may be an electronic device equipped with a large display, such as a TV or a desktop computer.

The first and second devices 110 and 120 may be configured to use various communication protocols, such as Bluetooth, Zigbee, Wireless Local Area Network (WLAN), Home Radio Frequency (RF), Ultra Wide Band (UWB), Wireless 1394, and the like to synchronize content. The first and second devices 110 and 120 may synchronize content therebetween without communicating information with each other. For example, the first device 110 may acquire a content execution screen of the second device 120, may analyze the acquired content execution screen, may identify content executed by the second device and state information corresponding to the content based on the results of the analysis, and may acquire the content from a database (not shown) or the content providing server 150.

The AR supporting server 130 may be connected to the first and second devices 110 and 120 via a communication network, and may provide augmented information corresponding to content to the first and second devices 110 and 120. For example, the AR supporting server 130 may be connected to the first or second devices 110 or 120 and may provide augmented information corresponding to content to whichever of the first and second devices 110 and 120 is connected thereto.

The broadcast providing apparatus 140 transmits broadcast signals including broadcast programs (such as audio/video (A/V) streams) and information corresponding to the broadcast programs through broadcast networks such as, but not limited to, satellites, terrestrial wave, the internet or cable networks. Examples of the information corresponding to the broadcast programs include electronic program guide (EPG) information and program description information corresponding to the broadcast programs. The broadcast providing apparatus 140 may be connected to the first and second devices 110 and 120 via a broadcast network and may provide broadcast content to the first and second devices 110 and 120 via the broadcast network. The first and second devices 110 and 120 may receive and play broadcast content.

The content providing server 150 may be a server for storing a plurality of content items and searching for and providing any one of the plurality of content items requested. The content providing server 150 may be connected to the first or second device 110 or 120, or a combination thereof via a communication network. The content providing server 150 may be configured to provide the first or second device 110 or 120, or a combination thereof, for example, the second device 120, with content requested.

The web server 160 may be a server for providing web services. The web server 160 may be connected to the first or second device 110 or 120, or a combination thereof via a communication network. The web server 160 may be configured to, in response the first or second device 110 or 120, or a combination thereof (for example, the second device 120) logging onto the web server 160 using user information, provide the first device 110 with web application state information corresponding to the state of the execution of a web application used by another device (for example, the first device 110) that has logged onto the web server 160 using the same user information as the second device 120 to use a web service. The user information may include a user identifier (ID), a password, and other authorization information for receiving a web service. The web application state information may include the state of the use of a web service by the second device 120, the history of web pages visited by the second device 120, and other user information corresponding to users that have communicated with the second device 120 via a web service.

As an example, assume that the first device 110 is a mobile terminal, and that the second device 120 is a digital TV.

In the example, the first device 110 may be a mobile terminal such as a remote control equipped with a display, a tablet PC, a smart phone, a mobile phone, or the like. The first device 110 may be configured to include an interface capable of enabling various modality inputs and outputs such as voice, text, image, and motion touch inputs and outputs and thus to provides an interaction functionality.

The first device 110 may provide its user with content synchronization with the second device 120. The first device 110 may provide its user with content being played by the second device 120 and augmented information relating to the content. Various augmented information may be provided to the user of the first device 110 related to the content. In consideration displaying of a large amount of augmented information may interfere with the viewing of content from the second device 120, and that there may be multiple users of the second device 120 who happen to be interested in different augmented information, the first device 110 may be configured to provide augmented information corresponding to the content along with the content. The first device 110 may filter out augmented information related to personal information (such as user profile information or user preference information) corresponding to its user from all augmented information provided by the second device 120 and may provide the filtered-out augmented information as the augmented information. Accordingly, the user of the first device 110 may be provided with the content, may also be provided with augmented information corresponding to the content and may selectively search for and use any desired augmented information corresponding to the content.

For example, the first device 110 may provide its user with TV content and augmented information corresponding to the TV content without interfering with the viewing of the TV content from the second device 120 (for example, a digital TV). The augmented information corresponding to the TV content may include interaction information that can interact with and be manipulated by the user of the first device 110. In response to the user of the first device 110 selecting the interaction information from the augmented information corresponding to the TV content, an operation corresponding to the interaction information may be performed so that the user of the first device 110 may manipulate the TV content.

The first device 110 may provide content and state information and augmented information corresponding to the content from the second device 120 so that the first and second devices 120 may synchronize and share the content with each other. Accordingly, the user of the first device 110 may allow content being played by the first device 110 to be shared with and displayed by the second device 120, which is equipped with a large display, and thus, the second device 120 may provide its users with the same content as the content being played by the first device 110 and augmented information corresponding to the content being played by the first device 110 synchronized with the first device 110. In other words, the first device 110 may be synchronized with any desired device (for example, the second device 120) while using content from the first device 110, and thus may provide a synchronized AR interaction that may be shared with other users.

For example, while playing a drama on the second device 120 with other users, the user of the first device 110 may search for and find any desired augmented information corresponding to the drama, such as the general description and the price of a particular product located in the drama, and may share the found desired augmented information with the other users.

Augmented information may include content playback control information. Accordingly, the first device 110 may control the playback of content synchronized with the second device 120 in response to the control playback control information being selected. For example, the user of the first device 110 may pause current TV content being shared between the first and second devices 110 and 120, may search through other channels through channel zapping, or may manipulate program guide information corresponding to the current TV content without interfering with the viewing of the current TV content from the second device 120.

The first device 110 may be configured to synchronize and share content with the second device 120 and, at the same time, execute an application that can be provided by, for example, a TV, such as communicating with contacts who are watching the same broadcast program as that being displayed on the second device 120 through a social networking service (SNS) (such as Twitter or a messenger service), without interfering with the viewing of content from the second device 120.

Figure 2:
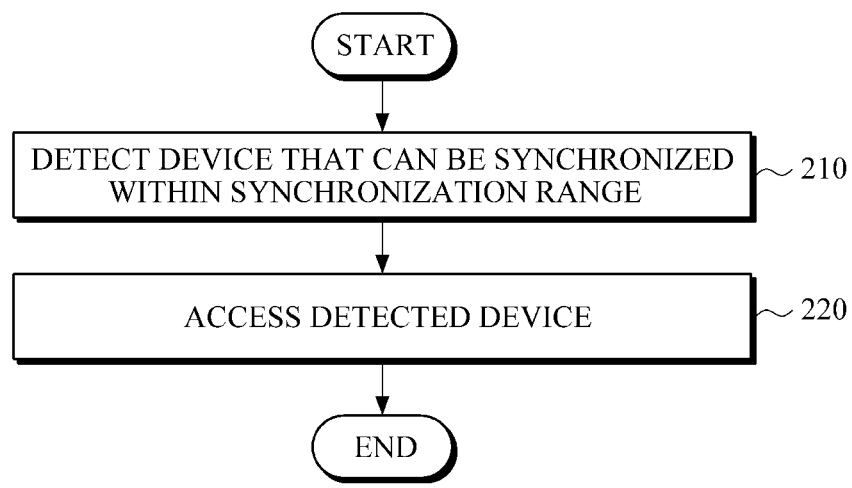
FIG. 2 is a flowchart illustrating an example of an initial operation of a first device illustrated in FIG. 1 to synchronize content with a second device.

FIG. 2 illustrates an example of an initial operation of the first device 110 to synchronize content with the second device 120.

The type and specification of device that the first device 110 may synchronize content with may be registered in advance with the first device 110. A plurality of devices may be registered with the first device 110 as synchronizable devices that the first device 110 may synchronize content with. Applications for synchronizing the plurality of devices with the first device 110 may be set in advance in the first device 110 and may be classified according to types of the plurality of devices.

Referring to FIG. 2, the first device 110 may detect a device registered with the first device 110 as a synchronizable device within a synchronization range of the first device 110. For example, the first device 110 may detect the second device 120 (210). The user of the first device 110 may register an IP address and identification information for communicating with the second device 120, and store the IP address and the identification information in the first device 110 so that the first device 110 may synchronize content with the second device 120.

The first device 110 may make a communication connection with the second device 120, which may be in its synchronization range, to communicate with the second device 120 so that signals may be synchronized between the first and second devices 110 and 120 (220). For example, the first device 110 may control the second device 120 to activate an operation mode for synchronizing the second device 120 with the first device 110.

As a non-limiting example, FIG. 2 illustrates the first device 110 performing an initial operation for being synchronized with the second device 120. In other words, the second device 120 may also detect a device registered with the second device 120 as a synchronizable device within its synchronization range. For example, the registered device may be the first device 110, and may make a communication connection with the first device 110.

In response to the first device 110 not needing to be provided with content and state information corresponding to the content of the second device 120 to synchronize content with the second device 120, for example, in a case in which the first device 110 can readily recognize content being played by the second device 120 and state information corresponding to the content, the operation illustrated in FIG. 2 may not be performed. For example, the operation illustrated in FIG. 2 may be selectively performed in response to the first and second devices 110 and 120 needing to communicate in order to synchronize content with each other.

Figure 3:
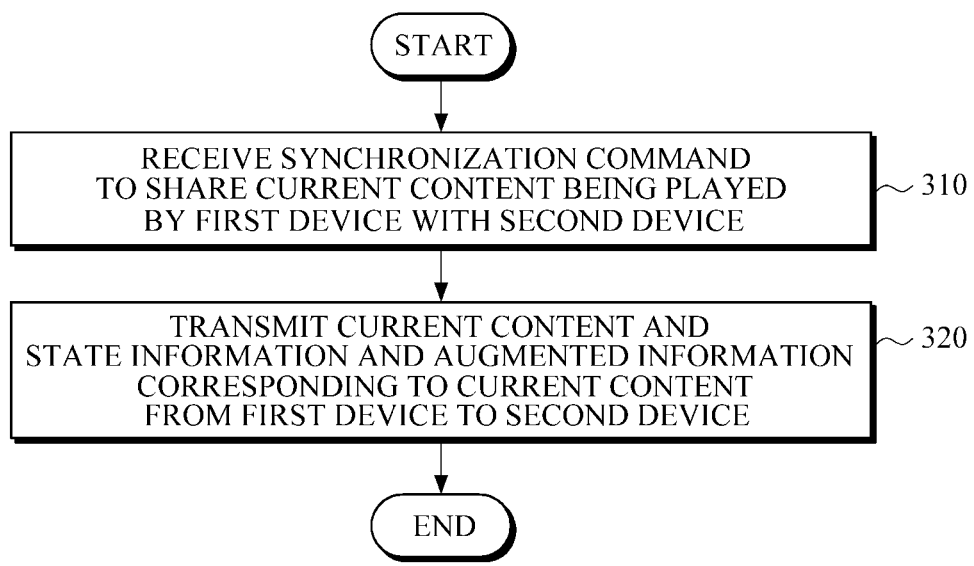
FIG. 3 is a diagram illustrating an example of an operation of a second device illustrated in FIG. 1 to share content being played by the first device illustrated in FIG. 1.

FIG. 3 illustrates an example of an operation of the second device 120 for sharing content being played by the first device 110.

Referring to FIG. 3, the first device 110 receives a synchronization command to share content being played by the first device 110 with another device such as, for example, the second device 120 (310).

The first device 110 transmits the content and state information corresponding to the content being played to the second device 120 (320). The first device 110 may additionally transmit augmented information relating to the content to the second device 120.

For example, in a case in which the first device 110 is a mobile terminal and the second device 120 is a digital TV, the second device 120 may be provided with synchronization information for synchronizing the content between the first and second devices 120, such as state information corresponding to the first device 110, the content, augmented information corresponding to the content, an application for playing the content, and the like. The second device 120 may display the synchronization information provided by the first device 110 at a resolution suitable for a TV display.

Figure 4:
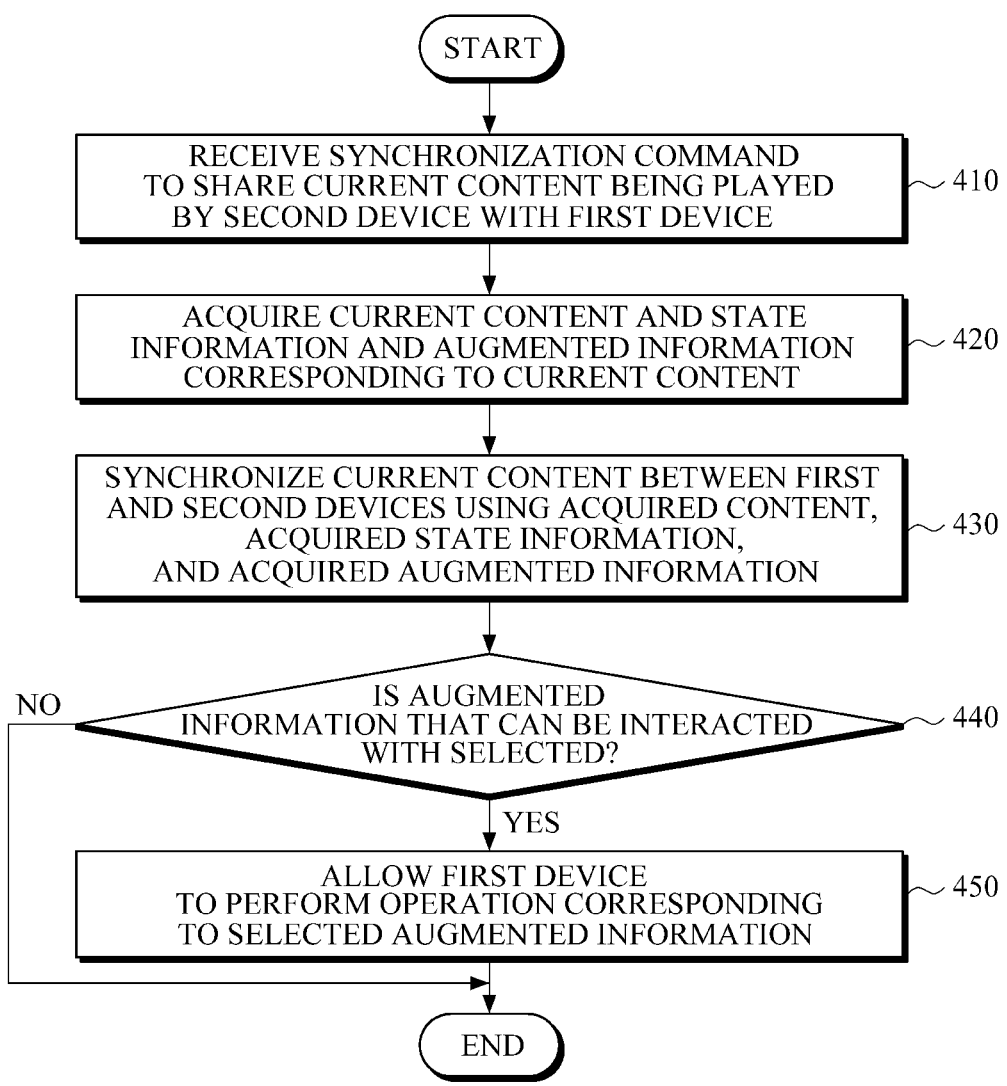
FIG. 4 is a diagram illustrating an example of an operation of the first device illustrated in FIG. 1 to share content being played by the second device illustrated in FIG. 1.

FIG. 4 illustrates an example of an operation of the first device 110 to share content being played by the second device 120.

Referring to FIG. 4, the first device 110 receives a synchronization command to share content being played by the second device 120 (410).

The first device 110 acquires content and state information and augmented information corresponding to the content from the second device 120 and shares the acquired content with the second device 120 (420). The first device 110 may also share the acquired augmented information with the second device 120.

The first device 110 may configure a display screen including the acquired content and the acquired augmented information by synchronizing itself with the second device 120 based on the acquired content, the acquired state information and the acquired augmented information (430). The configured display screen may be displayed on a display (not shown) of the first device 110.

In response to augmented information that may interact with the user of the first device 110 being selected from the configured display screen (440), the first device 110 may perform a predefined operation corresponding to the selected augmented information (450).

Figure 5:
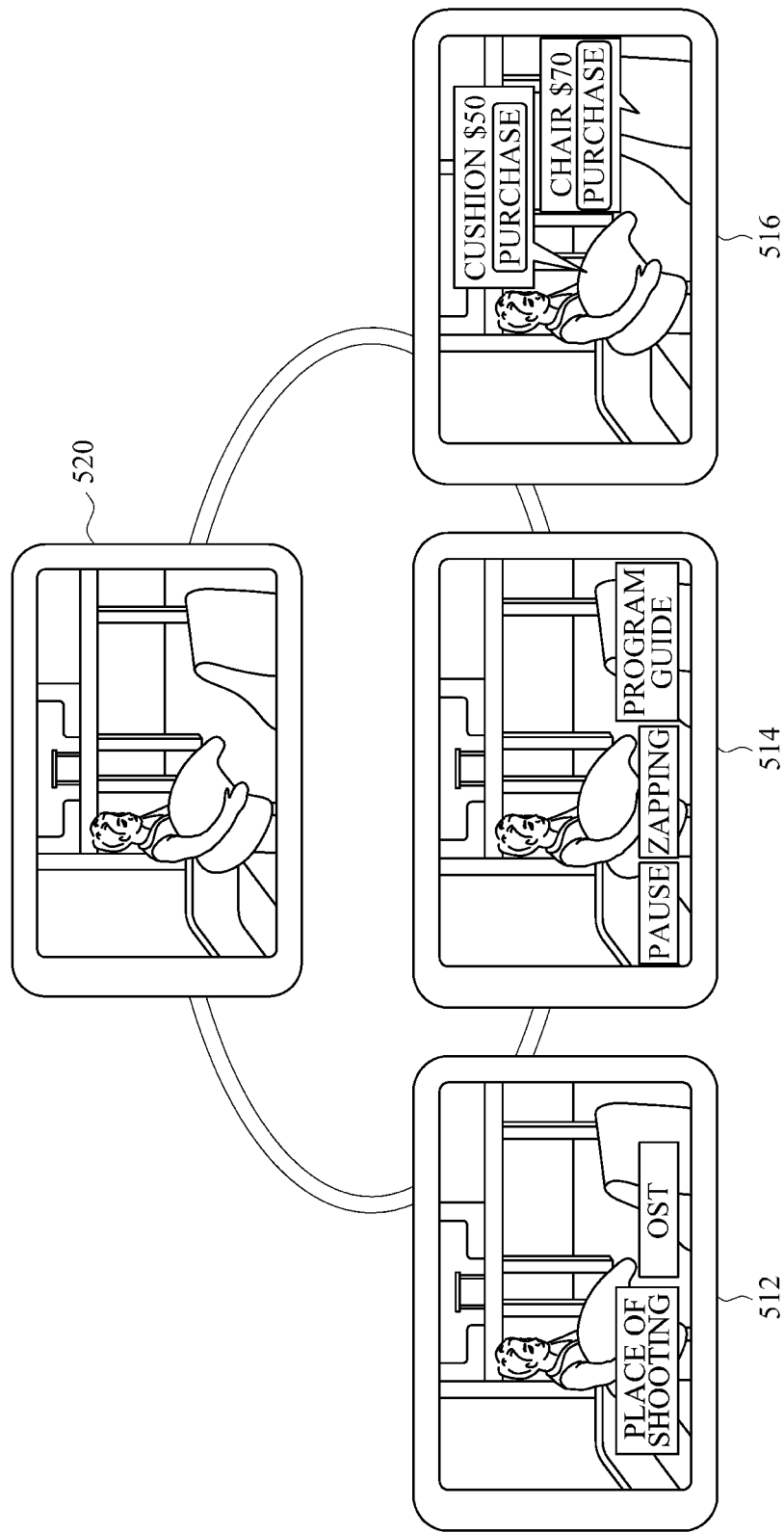
FIG. 5 is a diagram illustrating examples of display screens for explaining the sharing of being played by one device between other multiple devices.

FIG. 5 illustrates examples of display screens for explaining the sharing of content being played by one device between other multiple devices.

Referring to FIG. 5, a device 520 is a TV displaying broadcast content, and devices 512, 514, and 516 may be mobile terminals.

The mobile terminal 512 may be provided with synchronization information for synchronizing with the TV 520, such as the broadcast content and augmented information and state information corresponding to the broadcast content, by the TV 520, and may display the synchronization information thereon at a suitable resolution. The mobile terminal 512 may provide its user with augmented information, among other augmented information corresponding to the broadcast content, based on, for example, user profile information or user preference information. In a case in which the users of the mobile terminals 512, 514, and 516 are members of a family such as a father in his forties and his teenage daughters, they may have different preferences on augmented information. In this case, augmented information for each of the users of the mobile terminals 512, 514, and 516 may be provided based on their personal preferences on augmented information.

For example, the mobile terminal 512 may provide its user with information corresponding to the location of filming of the broadcast content and OST information corresponding to the broadcast content as augmented information. For example, the filming location information and the OST information may be selected by the user of the mobile terminal 512, and may be interaction information that can interact with the user of the mobile terminal 512 and may thus provide predefined information or lead to a predefined operation upon being selected by the user of the mobile terminal 512. In this example, the user of the mobile terminal 512 may be provided with augmented information corresponding to the broadcast content by selecting the filming location information or the OST information.

The user of the mobile terminal 514 may pause the broadcast content, may search through other channels through channel zapping, or may manipulate program guide information corresponding to the broadcast program without substantially interfering with the viewing of the broadcast program from the TV 520.

For example, the mobile terminal 516 may provide its user with interaction information related to a purchase or payment service as augmented information. In this example, the user of the mobile terminal 516 may use the purchase or payment service through the augmented information.

The users of the mobile terminals 512, 514, and 516, which may be synchronized with the TV 520, may perform various manipulations such as content control, device control, and application control without substantially interfering with the viewing of content from the TV 520. The users of the mobile terminals 512, 514, and 516 may synchronize any content and/or any augmented information that they find with the TV 520 so that the content and/or the augmented information may be shared with the users of the TV 520.

Figure 6:
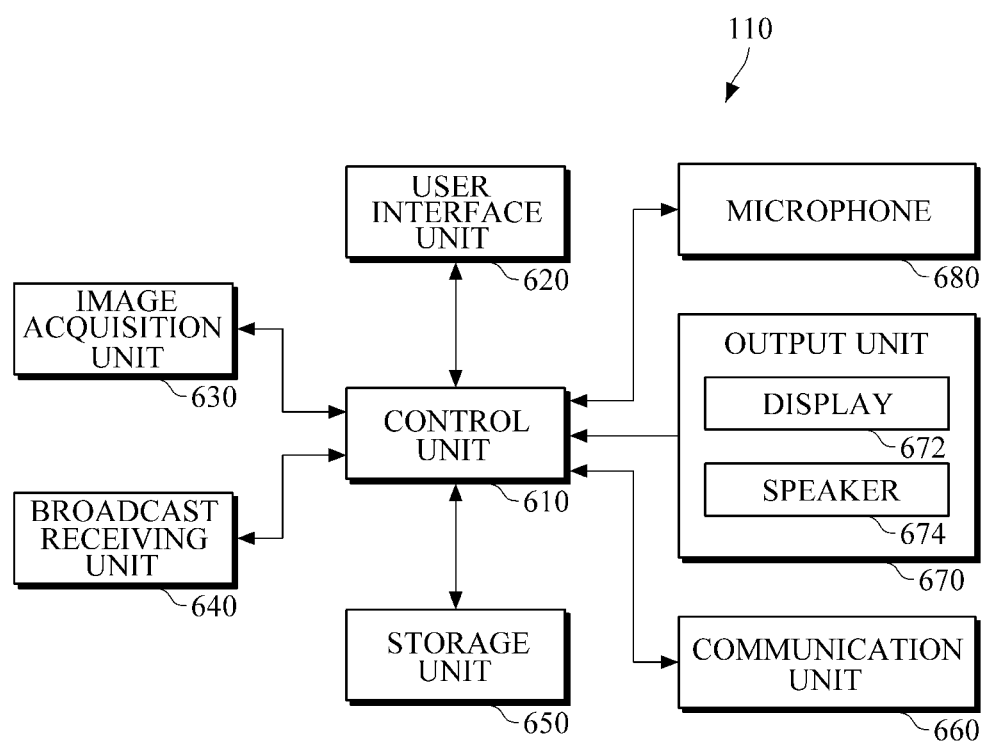
FIG. 6 is a diagram illustrating an example of the structure of the first device illustrated in FIG. 1.

FIG. 6 illustrates an example of the structure of the first device 110.

Referring to FIG. 6, the first device 110 includes a control unit 610, a user interface unit 620, an image acquisition unit 630, a broadcast receiving unit 640, a storage unit 650, a communication unit 660, an output unit 670, and a microphone 680.

The control unit 610 may control the general operation of the first device 110, and may include a decoder (not shown) for decoding audio and video streams. The control unit 610 may synchronize the first device 110 with another device, for example, the second device 120, to share content being played by the second device 120, and may perform an operation for sharing content being played by the first device 110 with the second device 120.

The user interface unit 620 may receive a user input signal and may transmit the user input signal to the control unit 610. The user interface unit 620 may include various types of user input units, such as a keypad, a touchpad, a jog shuttle, and the like. The user interface unit 620 may also include a touch pad that can sense a touch gesture made by the user of the first device 110. The touch pad may be integrated with a display 672 of the output unit 670 so that the results of the processing of a user input may be readily displayed on the display 672. The user interface unit 620 may employ a haptic technology and thus to provide a haptic effect or a sense of motion in response to a user input being received. For example, in response to a user input signal being received from the user of the first device 110, the user interface unit 620 may give haptic feedback to the user of the first device 110 so that the user of the first device 110 can feel what is happening.

The image acquisition unit 630, such as, for example, a camera, may include a lens, an imaging sensor (such as a charge-coupled device (CCD) or a complementary metal-oxide semiconductor (CMOS) sensor), an analog-to-digital (A/D) converter, and the like. The image acquisition unit 630 may acquire an image signal by capturing an image of a subject, may convert the acquired image signal into a digital signal, and may transmit the digital signal to the control unit 610. The control unit 610 may perform image processing, such as noise removal and color processing on the digital signal provided by the image acquisition unit 630. The control unit 610 may display a number of images of a subject captured in series by the image acquisition unit 630 on the display 672 to inform the user of the first device 110 of a current state of the subject being captured by the image acquisition unit 630.

The broadcast receiving unit 640 may receive broadcast programs via broadcast channels such as terrestrial broadcast channels, satellite broadcast channels or bidirectional channels such as the internet. In a case in which the broadcast receiving unit 640 receives broadcast programs via broadcast channels, the broadcast receiving unit 640 may to include 1) a tuner (not shown) for outputting a transport stream by tuning and for demodulating an input broadcast signal and 2) a demultiplexer (not shown) demultiplexing the transport stream output by the tuner into video and audio streams.

The storage unit 650 may store an operating system (OS), application programs and data related to the first device 110. The storage unit 650 may store user profile information, including the age and sex of the user of the first device 110, user preference information, or a combination thereof. The user profile information and the user preference information may be set and stored in advance in the storage unit 650. In response to a user input signal being received, new information may be added to the user profile information and the user preference information, or the user profile information and the user preference information may be modified or deleted. The storage unit 650 may also store various content items such as video files, music files, text and the like and augmented information corresponding to the various content items.

The communication unit 660 may communicate 1) with an external device connected to the first device 110 via a network or 2) with various servers such as the AR supporting server 130, the content providing server 150 and the web server 160. The communication unit 660 may include a first communication module that communicates with a server connected to the first device 110 via the internet and a second communication module that communicates with a device that the first device 110 may synchronize content with. For example, the communication unit 660 may be configured to support a variety of communication protocols such as Bluetooth, Zigbee, WLAN, Home RF, UWB, Wireless 1394, or a combination thereof.

The output unit 670 may include the display 672 and a speaker 674.

The microphone 680 may receive audio signals from the outside of the first device 110 and may transmit the received audio signals to the control unit 610.

The control unit 610 may detect any device registered in advance with the first device 110 as a synchronizable device within a synchronization range of the first device 110, and may control the communication unit 660 to connect the first device 110 to the detected synchronizable device.

In response to reception of a synchronization command to share content being played by the second device 120, the control unit 610 may acquire the content and state information and augmented information corresponding to the content from the second device 120, may synchronize the first device 110 with the second device 120 using the acquired content, the acquired state information, and the acquired augmented information, and may configure a display screen including the acquired content and the acquired augmented information.

In response to augmented information that can interact with the user of the first device 110 being selected from the acquired augmented information by a user input signal, the control unit 610 may perform a predefined operation corresponding to the selected augmented information.

The control unit 610 may select or filter out a portion of the augmented information from all the acquired augmented information based on the user profile information, the user preference information, or a combination thereof, and may provide the selected or filtered-out augmented information to the display 672 along with the acquired content.

Augmented information may include playback control information for controlling the playback of content. The control unit 610 may control the playback of synchronized content in response to a user input signal for selecting the playback control information being received. The control unit 610 may execute an application that may interact with the user of the first device 110 in parallel with the synchronization of content. The application that may interact with the user of the first device 110 may include an internet search application, a social networking application, or a combination thereof.

To share the content being played by the second device 120, the control unit 610 may be configured to acquire the content being played by the second device 120 from a device other than the second device 120. For example, in an effort to share real-time broadcast content being played by the second device 120, the control unit 610 may acquire content metadata corresponding to the real-time broadcast content from another device, and may control the broadcast receiving unit 640 to acquire the real-time broadcast content from a broadcast network using the content metadata.

The content metadata may be acquired by analyzing the synchronization command to share the content being played by the second device 120 and the circumstances of the operation of the second device 120 at the time of the receipt of the synchronization command. The content metadata may include a web address corresponding to the content being played by the second device 120, broadcast channel information corresponding to a broadcast channel from which the content being played by the second device 120 may be received, or a combination thereof. The content metadata may be a part of the content being played by the second device 120 (for example, video frames corresponding to a part of a video file or audio signals corresponding to a part of a music file), and may be formed in various types that can be suitable for use in the search of the content being played by the second device 120.

The control unit 610 may recognize the content being played by the second device 120 and state information corresponding to the content being played by the second device 120, may acquire the content being played by the second device 120, and may synchronize the first device 110 with the second device 120 using the acquired content and the acquired state information, without communicating with the second device 120.

For example, in a case in which the synchronization command to share the content being played by the second device 120 is received in response to an image being captured by the image acquisition unit 630, the control unit 610 may acquire content metadata corresponding to the content being played by the second device 120 by analyzing the captured image. In another example, the control unit 610 may use an audio signal detected for more than a predetermined amount of time by the microphone 680 as content metadata, may analyze the audio signal, and may search the storage unit 650 for a music file or a video file corresponding with the audio signal.

In response to content metadata being acquired, the control unit 610 may acquire additional augmented information from the AR supporting server 130 using the content metadata, may configure a display screen by rendering the additional augmented information with the content being played by the second device 120, and may display the configured display screen on the display 672.

For example, in response to a synchronization command to share content being played by the control unit 610 of the first device 110 with the second device 120, the control unit 610 may control the communication unit 660 to transmit the content being played by the control unit 610 and state information and augmented information corresponding to the content being played by the control unit 610 to the second device 120. In this example, the control unit 610 may transmit augmented information being displayed on the display 672 to another device of the same type as the first device 110.

Figure 7:
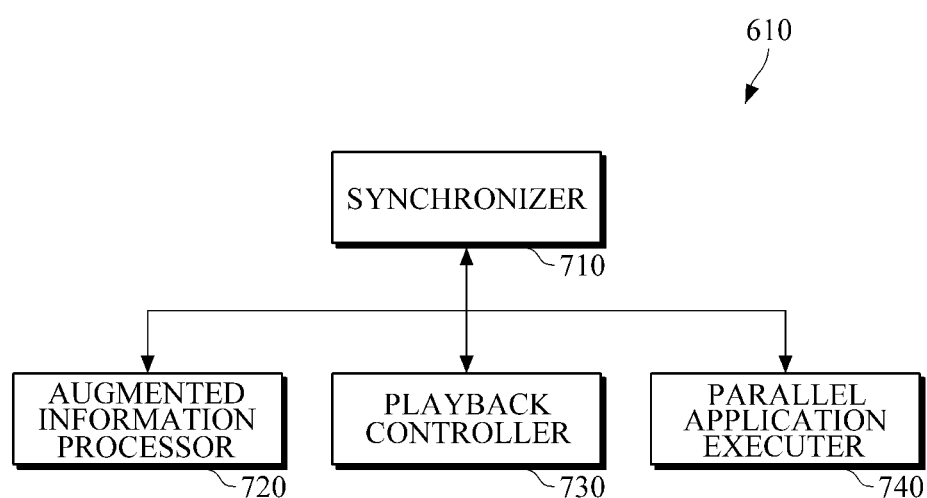
FIG. 7 is a diagram illustrating an example of the structure of a control unit illustrated in FIG. 6.

FIG. 7 illustrates an example of the structure of the control unit 610 illustrated in FIG. 6.

Referring to FIG. 7, the control unit 610 may include a synchronizer 710, an augmented information processor 720, a playback controller 730, and a parallel application executer 740.

The synchronizer 710 may share and synchronize content with another device, such as, for example, the second device 120.

In response to a reception of a synchronization command to share content being played by the second device 120, the synchronizer 710 may transmit synchronization information for sharing and synchronizing content to the second device 120.

In response to the reception of the synchronization command, the synchronizer 710 may recognize and acquire the content being played by the second device 120 and state information corresponding to the content being played by the second device 120, and may synchronize the acquired content between the first device 110 and the second device 120 using the acquired state information. The output unit 670 may output the content synchronized between the first device 110 and the second device 120.

In response to the image acquisition unit 630 capturing an image of a content execution screen displayed on the second device 120, the synchronizer 710 may recognize the content being played by the second device 120 and the state information corresponding to the content being played by the second device 120 by performing object extraction on the content execution screen, pattern recognition on the content execution screen, and character recognition on the content execution screen, or a combination thereof.

In response to an audio output unit (such as the microphone 680) receiving an audio signal corresponding to the content being played by the second device 120, the synchronizer 710 may extract feature information from the audio signal, and may recognize audio data corresponding to the extracted feature information.

The storage unit 650 may store at least one content item. The synchronizer 710 may search the storage unit 650 for any recognized content.

For example, the storage unit 650 may store content such that may be searched using feature information generated by the synchronizer 710 through object extraction, pattern recognition or character recognition. In another example, the storage unit 650 may store content that may be searched using feature information extracted from an audio signal. The feature information extracted from the audio signal may be an acoustic fingerprint, which corresponds with a condensed summary of an audio object, and may include one or more parameters that may be used to identify audio data or an audio file.

The synchronizer 710 may acquire content from the content providing server 150 through the communication unit 660 in a case in which the communication unit 660 searches through and communicates with the content providing server 150 using content metadata.

An operation performed by the synchronizer 710 in response to a synchronization command to share, for example, a web application being executed by the second device 120 being received will hereinafter be described. The user of the web application being executed by the second device 120 may be the same as the user of the first device 110.

In this example, the web application may provide information received from the web server 160 through the communication with the communication unit 660. The web application may include a messenger, Twitter, a blog, a web browser and the like. In response to a synchronization command to share the web application being received, the image acquisition unit 630 may acquire a web application execution screen from the second device 120.

The synchronizer 710 may identify the web application by performing object extraction on the acquired web application execution screen, pattern recognition on the acquired web application execution screen, character recognition on the acquired web application execution screen, or a combination thereof. For example, the synchronizer 710 may acquire user information for receiving a web service provided by the web server 160. The user information may include user login information such as a user ID, a password, and other authorization information. The synchronizer 710 may access the web server 160 using the user information, may acquire state information corresponding to the web application from the web server 160 through the communication unit 660, and may reproduce the same execute state as the web application being executed by the second device 120 using the identified web application and the acquired state information.

In another example, the synchronizer 710 may acquire the user information, which is for receiving a web service from the web server 160 using at least one web application, from the storage unit 650 storing the user information.

In yet another example, the synchronizer 710 may acquire the user information from the second device 120 in a case in which the communication unit 660 is configured to communicate with and acquire the user information from the second device 120. The synchronizer 710 may access the web server 160 using the user information, may acquire the state information corresponding to the web application from the web server 160 through the communication unit 660, and may reproduce the execution state of the web application in the second device 120 using the acquired state information.

In a case in which the web application is a messenger program providing a one-on-one chat service, the synchronizer 710 may identify the messenger program from a content execution screen on the second device 120, and may execute the messenger program. The messenger program may be a program that may be supported by a web server communicating with the second device 120 and may not be the same program as the messenger program executed in the second device 120. For example, the messenger program may be a program optimized for being executed by the synchronizer 710. The synchronizer 710 may access the web server 160 through the messenger program by using user information, may acquire the state information corresponding to the messenger program, for example, information corresponding to the party who engages in a one-on-one chat session with the user of the second device 120, from the web server 160, and may proceed with the one-on-one chat session.

In response to reception of a synchronization command to share content being played by the second device 120, the synchronizer 710 may share the content being played by the second device 120 by acquiring the content being played by the second device 120, state information corresponding to the content being played by the second device 120 from the second device 120 and augmented information corresponding to the content being played by the second device 120 from the second device 120, and may configure a display screen including the acquired content and the acquired augmented information by synchronizing the acquired content between the first device 110 and the second device 120 based on the acquired content, the acquired state information and the acquired augmented information. In response to reception of a synchronization command to share content being played by the control unit 610 of the first device 110 with the second device 120, the synchronizer 710 may control the communication unit 660 to transmit the content, state information corresponding to the content to the second device 120 and augmented information corresponding to the content to the second device 120.

The augmented information processor 720 may filter out some augmented information from the acquired augmented information using user profile information, user preference information, or a combination thereof, and may provide the filtered-out augmented information to the synchronizer 710. Accordingly, the synchronizer 710 may reconfigure a display screen by rendering the filtered-out augmented information with the content being played by the first device 110.

The playback controller 730 may be configured to control the playback of content synchronized between the first device 110 and the second device 120 without modifying the state of the second device 120. For example, in a case in which the second device 120 is a TV, the playback controller 730 may control the playback of content shared between the first device 110 and the TV, and may manipulate content being played by the TV without substantially interfering with other users' viewing of content from the TV.

The parallel application executer 740 may be configured to execute an application that may interact with the user of the first device 110 in parallel with the synchronization of content. For example, the parallel application executer 740 may allow the user of the first device 110 to execute an application that may be provided by, for example, a TV, searching through the internet or communicating with contacts who are watching the same TV content as the TV content being displayed on the TV through an SNS (such as Twitter or a messenger), without substantially interfering with the viewing of TV content from the TV. Accordingly, providing a personal interaction space where the user of the first device 110 may freely perform manipulations in connection with content being shared with other users without substantially interfering with the other users may be possible, and providing a more intuitive short-range interaction for particular functions (such as browsing) for which an short-range interaction may be more suitable than a long-range interaction.

The second device 120 may perform the functions of the first device 110. For example, in a case in which the second device 120 is a TV, the second device may provide content and state information and augmented information corresponding with the content to the first device 110 to synchronize the content with the first device 110, and the first device 110 may synchronize the content provided by the second device 120 and may display the synchronized content on its screen.

Figure 8:
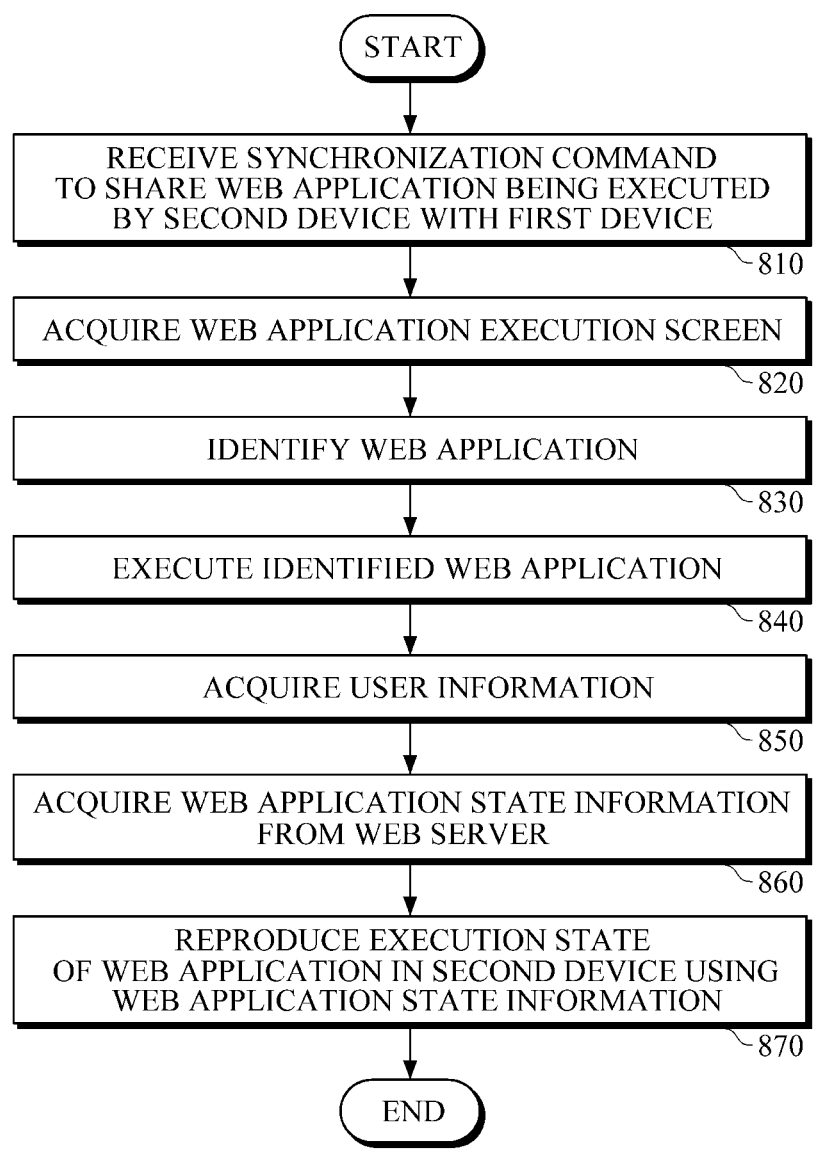
FIG. 8 is a flowchart illustrating an example of a method of synchronizing a web application being executed by one device with another device.

FIG. 8 illustrates an example of a method of synchronizing a web application being executed by one device with another device.

Referring to FIG. 8, in operation 810, a first device receives a synchronization command to share a web application being executed by a second device.

In response to the reception of the synchronization command, in operation 820, the first device acquires a web application execution screen displayed on the second device 120 based on the web application.

In operation 830, the first device identifies the web application by performing object extraction on the acquired web application execution screen, pattern recognition on the acquired web application execution screen, character recognition on the acquired web application execution screen, or a combination thereof. In operation 840, the first device executes the identified web application.

In operation 850, the first device acquires user information for providing a web service. The user information may be acquired from the storage of the first device or from another device.

In operation 860, the first device accesses a web server using the identified web application and the acquired user information, and acquires state information corresponding to the identified web application from the web server (860).

In operation 870, the first device reproduces the execution state of the web application in the second device using the acquired state information.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content synchronization apparatus, comprising:
a communication unit configured to communicate with a device with which the content synchronization apparatus can synchronize content;
a control unit configured to share current content being played by the device by acquiring the current content and state information corresponding with the current content through the communication unit, synchronize the current content with the device using the current content and the state information, and configure a display screen based on the results of the synchronization of the current content; and
an output unit configured to display the configured display screen,
wherein the control unit is further configured to acquire augmented reality information corresponding to the current content, and select and display the acquired augmented reality information as personalized augmented reality information for a particular user of the content synchronization apparatus, the augmented reality information comprising interaction information that interact with a user or other devices to control the content or to share the augmented reality information.

2. The content synchronization apparatus of claim 1, wherein the control unit acquires the augmented reality information corresponding with the current content from the device, and, in response to augmented reality information that can interact with the user of the content synchronization apparatus being selected from the acquired augmented reality information, performs a predefined operation corresponding to the selected augmented reality information.

3. The content synchronization apparatus of claim 2, further comprising a storage unit configured to store user profile information corresponding to the user of the content synchronization apparatus, user preference information corresponding to the user of the content synchronization apparatus, or a combination thereof,
wherein the control unit selects and displays the personalized augmented reality information from the acquired augmented reality information using the user profile information, the user preference information, or a combination thereof and configures a display screen including the current content and the selected personalized augmented reality information.

4. The content synchronization apparatus of claim 2, wherein the communication unit communicates with an augmented reality (AR) supporting server, which provides augmented reality information corresponding a plurality of content items, and the control unit acquires additional augmented reality information corresponding to the current content from the AR supporting server using acquired content metadata and configures the display screen by rendering the additional augmented reality information with the current content.

5. The content synchronization apparatus of claim 2, wherein the acquired augmented reality information comprises playback control information for controlling the playback of the current content, and the control unit, in response to reception of a user input signal for selecting the playback control information, controls the playback of the current content.

6. The content synchronization apparatus of claim 2, wherein the control unit, in response to reception of a synchronization command to share content being played by the content synchronization apparatus with the device, transmits the content being played by the content synchronization apparatus and state information and augmented reality information corresponding to the content being played by the content synchronization apparatus to the device.

7. The content synchronization apparatus of claim 1, wherein the control unit acquires content metadata corresponding with the current content from the device and acquires the current content from another device than the device using the content metadata, the content metadata being used to search for the current content.

8. The content synchronization apparatus of claim 7, wherein the content metadata comprises a web address corresponding to the current content, broadcast channel information corresponding to a broadcast channel from which the current content can be received, or a combination thereof.

9. The content synchronization apparatus of claim 8, further comprising an image acquisition unit configured to capture an image,
wherein the control unit in a case in which the reception of the synchronization command in response to an image being captured by the image acquisition unit, acquires content metadata corresponding to the current content by analyzing the captured image.

10. The content synchronization apparatus of claim 1, wherein the control unit executes an application that can interact with the user of the content synchronization apparatus in parallel with the synchronization of the current content.

11. The content synchronization apparatus of claim 10, wherein the application that can interact with the user of the content synchronization apparatus comprises an internet search application, a social networking application, or a combination thereof.

12. The content synchronization apparatus of claim 1, wherein the control unit is further configured to detect the device within a synchronization range of the content synchronization apparatus and control the communication unit to access the device.

13. A content synchronization method, comprising:
receiving a synchronization command to share current content being played by a device;
sharing the current content by acquiring the current content and state information corresponding to the current content;
synchronizing the current content with the device using the current content and the state information; and
acquiring augmented reality information corresponding to the current content; and
selecting and displaying the acquired augmented reality information as personalized augmented reality information for a particular user of a content synchronization apparatus,
wherein the augmented reality information comprises interaction information that interact with a user or other devices to control the content or to share the augmented reality information.

14. The content synchronization method of claim 13, further comprising:
acquiring content metadata corresponding to the current content from the device; and
directly acquiring the current content from another device other than the device using the content metadata.

15. The content synchronization method of claim 14, wherein the directly acquiring the current content comprises, in response to the current content being real-time broadcast content, acquiring the current content by receiving the real-time broadcast content from a broadcast network using the content metadata.

16. The content synchronization method of claim 13, further comprising, in parallel with the synchronizing the current content, executing an application that can be interacted with by the user.

17. The content synchronization method of claim 13, further comprising, in response to reception of a synchronization command to share the current content with another device, transmitting the current content and state information and the augmented reality information corresponding to the current content to the another device.

18. The content synchronization method of claim 13, further comprising acquiring the augmented reality information corresponding to the current content from the device,
wherein the synchronizing the current content comprises synchronizing the current content with the device using the current content, the state information, and the augmented reality information.

19. The content synchronization method of claim 18, wherein the personalized augmented reality information is selected based on user profile information, user preference information, or a combination thereof.

20. The content synchronization method of claim 18, wherein the augmented reality information comprises playback control information for controlling the playback of the current content and the content synchronization method further comprises, in response to reception of a user input signal for selecting the playback control information, controlling the playback of the current content.

21. A content synchronization apparatus, comprising:
a synchronization unit configured to acquire current content being played by a device and state information corresponding to the current content by recognizing the current content and the state information, and to synchronize the current content with the device using the current content and the state information; and
an output unit configured to output the synchronized content,
wherein the synchronization unit is further configured to acquire augmented reality information corresponding to the current content, and select and display the acquired augmented reality information as personalized augmented reality information for a particular user of the content synchronization apparatus, the augmented reality information comprising interaction information that interact with a user or other devices to control the content or to share the augmented reality information.

22. The content synchronization apparatus of claim 21, further comprising an image acquisition unit configured to capture an image of a content execution screen corresponding to the current content,
wherein the synchronization unit recognizes the current content and the state information by performing object extraction, pattern recognition, character recognition on the content execution screen, or a combination thereof.

23. The content synchronization apparatus of claim 21, further comprising an audio input unit configured to receive an audio signal corresponding to the current content,
wherein the synchronization unit extracts feature information from the received audio signal and recognizes audio data corresponding to the feature information.

24. The content synchronization apparatus of claim 21, further comprising a storage unit configured to store at least one content item, wherein the synchronization unit acquires the recognized current content by searching through the storage unit.

25. The content synchronization apparatus of claim 21, further comprising a communication unit configured to communicate with a content providing server, which searches for content using content metadata and provides content,
wherein the synchronization unit acquires the current content from the content providing server via the communication unit.

26. A content synchronization apparatus, comprising:
a detection unit configured to detect another device in response to the other device being located within a synchronization range;
a control unit configured to share current content being played by the other device, state information corresponding with the current content, and augmented reality information corresponding with the current content, in response to detecting of the other device being located within the synchronization range; and
a reception unit configured to receive the current content, the state information, and the augmented reality information from the other device,
wherein the control unit is further configured to select and display the acquired augmented reality information as personalized augmented reality information for a particular user of the content synchronization apparatus, the augmented reality information comprising interaction information that interact with a user or other devices to control the content or to share the augmented reality information.

27. The content synchronization apparatus of claim 26, wherein the state information includes information about the content.

28. The content synchronization apparatus of claim 26, wherein the augmented reality information includes information that is capable of being provided with the content.

* * * * *